United States Patent
Wood et al.

(10) Patent No.: US 7,425,121 B2
(45) Date of Patent: Sep. 16, 2008

(54) ROTARY VANE PUMP

(76) Inventors: Gregory P. Wood, 4933 Midway Rd., #45, Vacaville, CA (US) 95688; Phillip V. Cortez, 4200 Sherwood Ct., Concord, CA (US) 94521; Michael A. Citro, 395 W. Bolton Rd., Oakley, CA (US) 94561

( * ) Notice: Subject to any disclaimer, the term of this patent is extended or adjusted under 35 U.S.C. 154(b) by 0 days.

(21) Appl. No.: 11/088,708

(22) Filed: Mar. 23, 2005

(65) Prior Publication Data

US 2005/0214152 A1    Sep. 29, 2005

Related U.S. Application Data

(60) Provisional application No. 60/556,279, filed on Mar. 25, 2004.

(51) Int. Cl.
*F03C 2/00* (2006.01)
*F04C 18/00* (2006.01)

(52) U.S. Cl. .............. 418/259; 418/148; 418/149; 418/268; 310/103; 310/104; 417/420

(58) Field of Classification Search ................ 418/94, 418/145, 148, 149, 259, 266–270, 260, 264; 310/103, 104; 417/420
See application file for complete search history.

(56) References Cited

U.S. PATENT DOCUMENTS

| | | | |
|---|---|---|---|
| 771,593 A | 10/1904 | Welsh | |
| 2,256,459 A | 9/1941 | Kendrick | |
| 3,103,893 A | 9/1963 | Henning | |
| 3,249,777 A | 5/1966 | Congdon et al. | |
| 3,604,823 A | 9/1971 | Thomas | |
| 3,802,804 A * | 4/1974 | Zimmermann | 417/360 |
| 3,932,068 A * | 1/1976 | Zimmermann | 417/420 |
| 4,152,099 A * | 5/1979 | Bingler | 417/420 |
| 4,174,931 A | 11/1979 | Ishizuka | |
| 4,257,753 A | 3/1981 | Sakamaki | |
| 4,738,603 A | 4/1988 | Hattori | |
| 4,799,867 A | 1/1989 | Sakamaki | |
| 5,037,283 A | 8/1991 | Kapur et al. | |
| 5,181,844 A * | 1/1993 | Bishop et al. | 418/152 |
| 5,431,552 A | 7/1995 | Schuller | |
| 6,364,630 B1 | 4/2002 | Craft | |
| 6,422,845 B1 | 7/2002 | Wong | |
| 6,435,851 B2 | 8/2002 | Mallen | |

* cited by examiner

*Primary Examiner*—Theresa Trieu
(74) *Attorney, Agent, or Firm*—Christenson O'Connor Johnson Kindness PLLC (57) ABSTRACT

A pump assembly (100) having a pump housing (206 and 208) and a rotor (222) rotatingly disposed within the housing, the rotor having a plurality of slots (226). The pump assembly includes a plurality of vanes (224), each vane moveably disposed in one of the plurality of slots, and an input shaft (228) coupled to the rotor for applying a torque to the rotor. The pump assembly (100) also includes a prime mover (400) for generating a torque and a magnetic coupling unit (300) for magnetically transferring the torque generated by the prime mover to the input shaft. The vanes may have a leg (256) which extends radially inward from a blade (254). The rotor and input shaft may be integrally formed.

9 Claims, 9 Drawing Sheets

ROTARY VANE PUMP

CROSS-REFERENCE TO RELATED APPLICATION

This application claims the benefit of U.S. Provisional Application No. 60/556,279, filed Mar. 25, 2004, entitled Vane Pump, the disclosure of which is hereby expressly incorporated by reference.

FIELD OF THE INVENTION

The present invention relates generally to pumps for pumping fluids, and more specifically to rotary vane pumps.

BACKGROUND OF THE INVENTION

Rotary vane pumps are positive displacement pumps that utilize vanes that work with a cam or sealing surface to draw fluid into and force said fluid out of a pump housing. Although effective, previously developed rotary vane pumps are not without their problems. For instance, previously developed rotary vane pumps are inefficient. One reason for their inefficiency is the utilization of dynamic seals to seal in the fluid being pumped. As a case in point, previously developed rotary vane pumps use a dynamic seal between a rotating input shaft coupled to a rotor and the pump housing in which the rotating input shaft passes through. This dynamic seal results in friction losses and is prone to leakage and failure.

Conventional vanes are also inefficiently designed. Such conventional vane designs result in high shear forces and accompanying friction losses as a relatively large surface area of a side of a vane slides against a wall of the slot in which the vane reciprocates radially inward and outward as an outer edge of the vane slides along the sealing surface of the pump housing. Additionally, previously developed rotary vane pumps which do not use mechanical means to bias the vanes outward to the sealing surface, i.e., which use centrifugal and hydraulic forces to bias the vanes outward, have a vane design or geometry that does not provide adequate hydraulic balancing of the forces exerted upon the vane to drive the vane toward the sealing surface, such that the vane is either overly or under driven outward toward the sealing surface by the hydraulic forces acting upon the vane.

Other problems arise from conventional rotor and drive shaft combinations. For example, the rotor and drive shaft combination of previously developed rotary vane pumps are expensive to manufacture since the rotor and drive shaft are separately machined, and then coupled to one another. In addition, previously developed rotary vane pumps have not been able to be manufactured in miniature sizes for use in low flow situations. As an example, previously developed rotary vane pumps have flow rates which exceed 3 ml per revolution of the rotor and have rotors exceeding 2 inches in diameter. Rotary vane pumps having lower flow rates and rotor diameters have hereto eluded those skilled in the art.

Additionally, previously developed rotor designs have not been able to address the issue of providing rigidity between the dividing members (the material between adjacent slots in which the vanes reciprocate) of the rotor, especially in smaller diameter rotors. Moreover, in prior designs, as the slots are radially oriented, the width of the dividing members steadily decreases as the slots converge toward the center axis of the rotor. Thus, from a top view of the dividing members, they are in the shape of a piece of pie, causing a week point at a base (the pointed end of the "piece of pie") of the dividing members. The dividing members are thus thin at their bases and have very little material to resist torques applied to the dividing members during use.

Thus, there exists a need for a rotary vane pump that addresses one or more of problems associated with previously developed rotary vane pumps, that is reliable, and inexpensive to manufacture.

SUMMARY OF THE INVENTION

One embodiment of a rotary vane pump formed in accordance with the present invention for pumping a fluid is disclosed. The rotary vane pump includes a pump housing defining an interior chamber and a rotor rotatingly disposed within the interior chamber, the rotor having a plurality of slots. The rotary vane pump includes a plurality of vanes, each vane moveably disposed in one of the plurality of slots. An input shaft is coupled to the rotor for applying a torque to the rotor. The input shaft and rotor are a unitary, integrally formed component. The plurality of vanes are actuatable into a substantially sealing relationship with a sealing surface of the pump housing by centrifugal forces and hydraulic forces and not mechanical forces.

Another embodiment of a rotary vane pump formed in accordance with the present invention for pumping a fluid is disclosed. The rotary vane pump includes a pump housing having an outlet and an aperture. A rotor is rotatingly disposed within the housing, the rotor having a plurality of slots. The rotary vane pump includes a plurality of vanes, each vane moveably disposed in one of the plurality of slots. An input shaft is coupled to the rotor for applying a torque to the rotor, wherein the rotor passes through the aperture in the housing such that at least a portion of the input shaft is disposed externally of the housing. The aperture does not sealingly engage the input shaft in a dynamic seal such that a fluid may freely flow along the length of the input shaft and through the aperture.

Still another embodiment of a rotary vane pump formed in accordance with the present invention for pumping a fluid is disclosed. The rotary vane pump includes a pump housing and a fixed shaft disposed in the housing. The rotary vane pump includes a rotor having a bore for rotatingly receiving the fixed shaft and a plurality of slots. The rotary vane pump includes a plurality of vanes, each vane moveably disposed in one of the plurality of slots. An input shaft is coupled to the rotor for applying a torque to the rotor for rotating the rotor upon the fixed shaft.

An additional embodiment of a rotary vane pump formed in accordance with the present invention for pumping a fluid is disclosed. The rotary vane pump includes a pump housing and a rotor having a plurality of dividing members and a plurality of slots disposed between adjacent dividing members. The rotary vane pump includes a plurality of strengthening members, each strengthening member disposed in one of the plurality of slots and coupled to adjacent dividing members. The rotary vane pump further includes a plurality of vanes, each vane moveably disposed in one of the plurality of slots.

Still another embodiment of a rotary vane pump formed in accordance with the present invention for pumping a fluid is disclosed. The rotary vane pump includes a rotary vane pump for pumping a fluid and a pump housing. A rotor having a plurality of dividing members and a plurality of slots disposed between adjacent dividing members is disposed in the pump housing. The rotary vane pump also includes a plurality of vanes, each vane moveably disposed in one of the plurality of slots. Each vane includes a blade, a first leg coupled to the blade, and a second leg coupled to the blade. The first and second legs are spaced from one another a selected distance and extend radially inward from the blade.

One embodiment of a pump assembly formed in accordance with the present invention is disclosed. The pump assembly includes a pump housing and a rotor rotatingly disposed within the pump housing, the rotor having a plurality of slots. The pump assembly includes a plurality of vanes, each vane moveably disposed in one of the plurality of slots and an input shaft. The input shaft is coupled to the rotor for applying a torque to the rotor. The pump assembly also includes a prime mover for generating a torque and a magnetic coupling unit for magnetically transferring the torque generated by the prime mover to the input shaft.

One embodiment of a vane formed in accordance with the present invention for use in a rotary vane pump is disclosed. The vane includes a blade having a surface extending in a first direction from a distal face of the blade to a proximal face of the blade. A first leg is coupled to the blade so that at least a portion of the first leg extends in the first direction outward past the proximal face of the blade.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
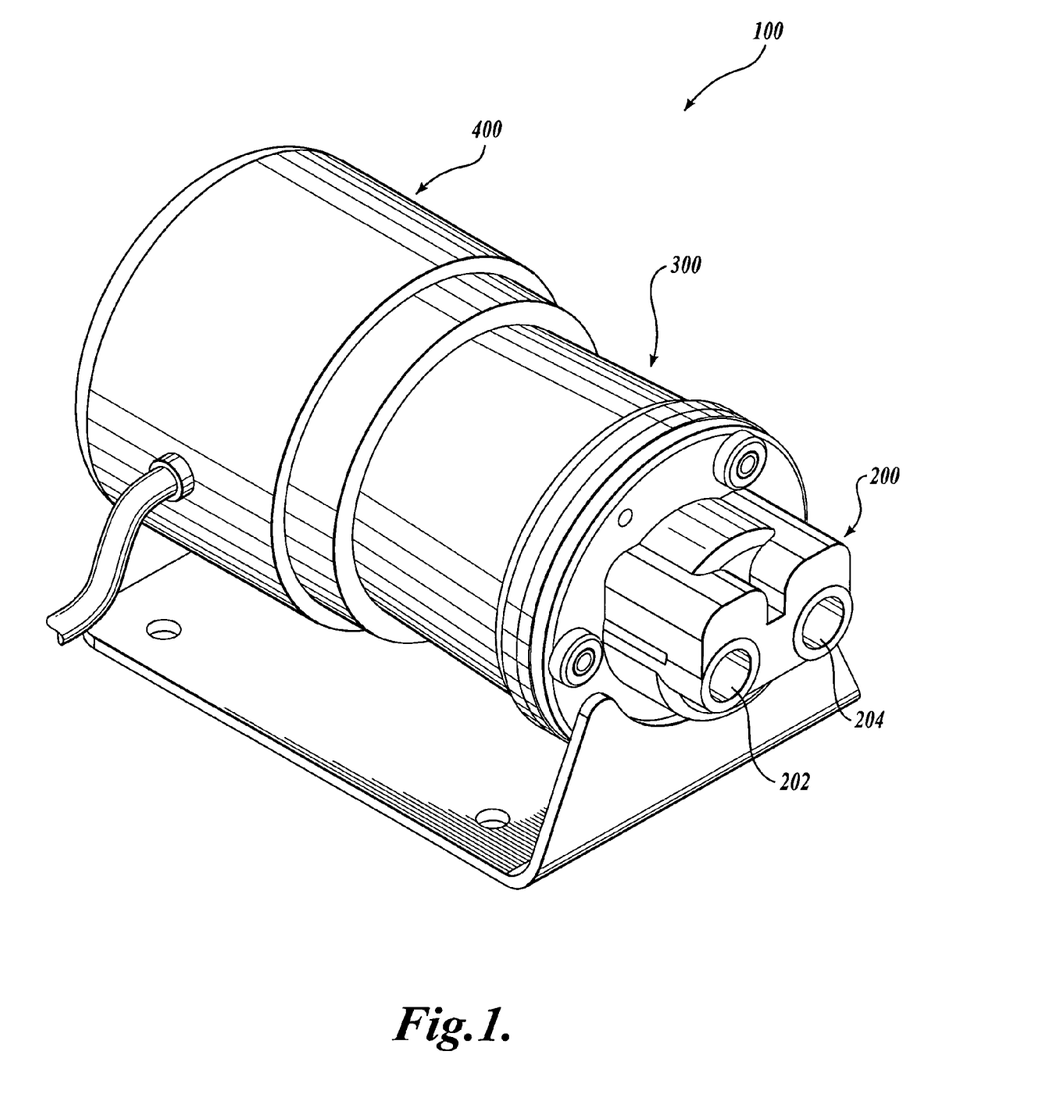
FIG. 1 is a perspective view of one embodiment of a pump assembly formed in accordance with the present invention, the pump assembly including a rotary vane pump, a transmission unit, and a prime mover.

Referring to FIGS. 1-11, one embodiment of a pump assembly 100 formed in accordance with the present invention for pumping a fluid is shown. Turning to FIG. 1, the pump assembly 100 includes a rotary vane pump 200 coupled to a prime mover 400 via a transmission, such as magnetic coupling unit 300. Generally described, the prime mover 400 provides a rotary input to the magnetic coupling unit 300. The magnetic coupling unit 300 transfers the rotary input from the prime mover 400 to the rotary vane pump 200. The rotary vane pump 200, using the energy transferred to it from the prime mover 400 via the magnetic coupling unit 300, pumps a fluid from an input passageway 202 to an outlet passageway 204.

Figure 2:
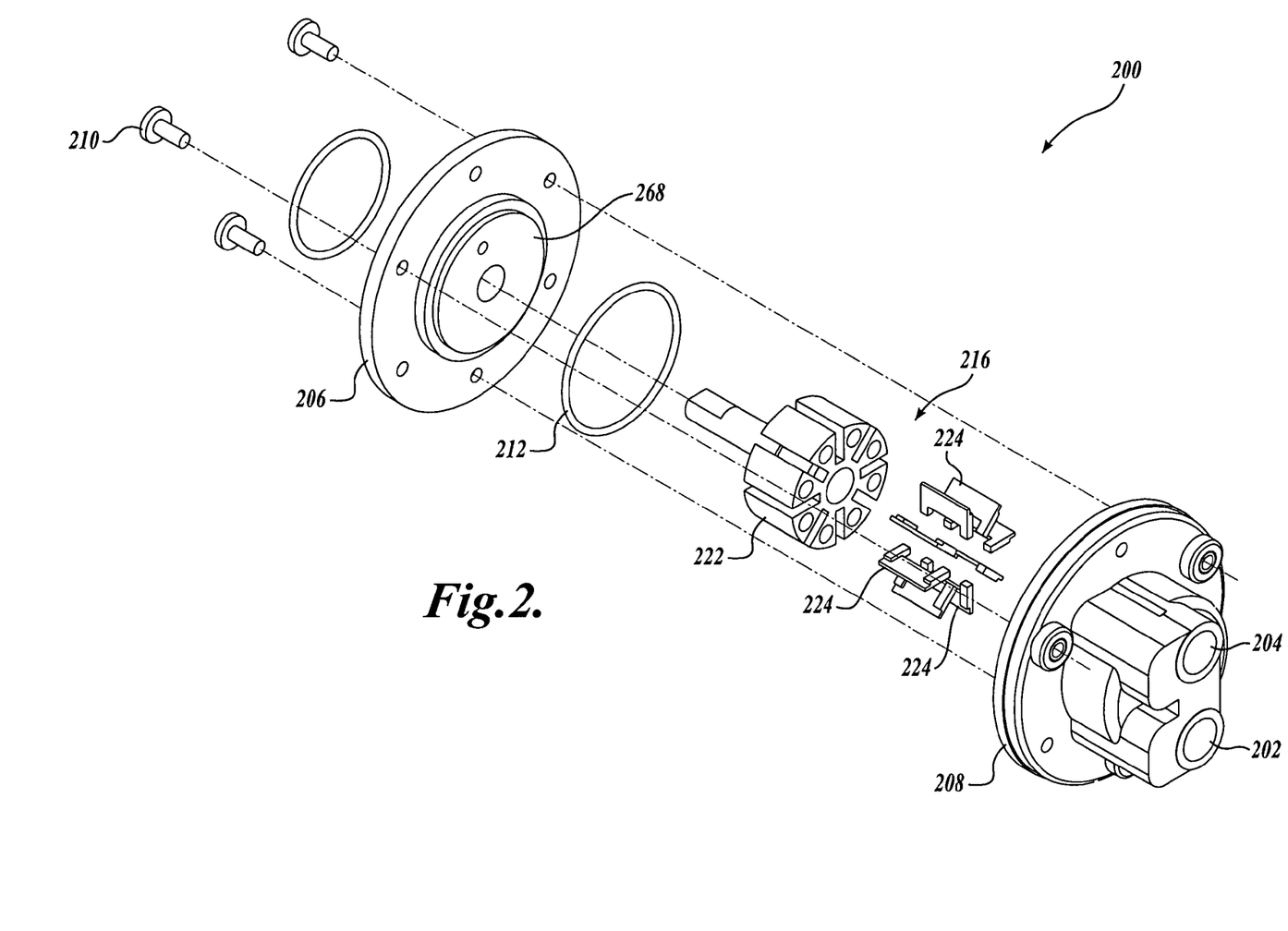
FIG. 2 is an exploded perspective view of the rotary vane pump of FIG. 1.

Focusing now in more detail upon the rotary vane pump 200 and referring to FIG. 2, the rotary vane pump 200 includes a two piece housing formed from an end plate 206 and a main body portion 208. The end plate 206 may be coupled to the main body portion 208 by any suitable means, one suitable example being a plurality of fasteners 210. Any suitable sealing member 212, one suitable example being an O-ring, may be disposed between the end plate 206 and the main body portion 208 to seal the two parts of the housing together. When the end plate 206 is sealingly engaged with the main body portion 208, the housing formed by their coupling defines a substantially cylindrical interior or inner chamber 214 (see FIG. 7).

Figure 3:
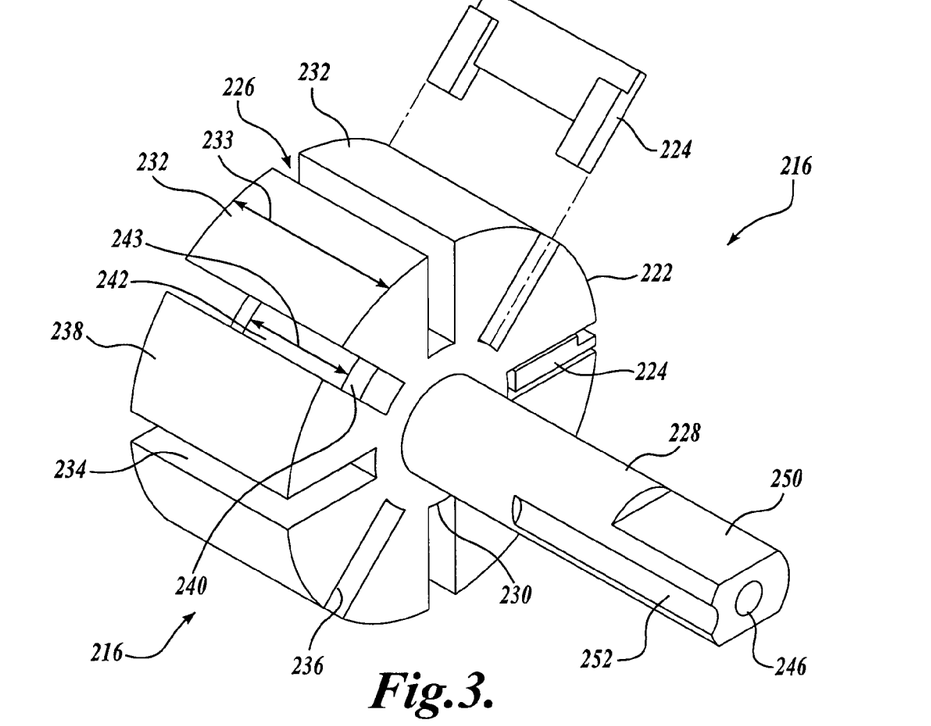
FIG. 3 is a partially exploded perspective view of a rotor assembly of the rotary vane pump of FIG. 2, wherein all but two of a set of vanes have been removed for clarity.
Figure 4:
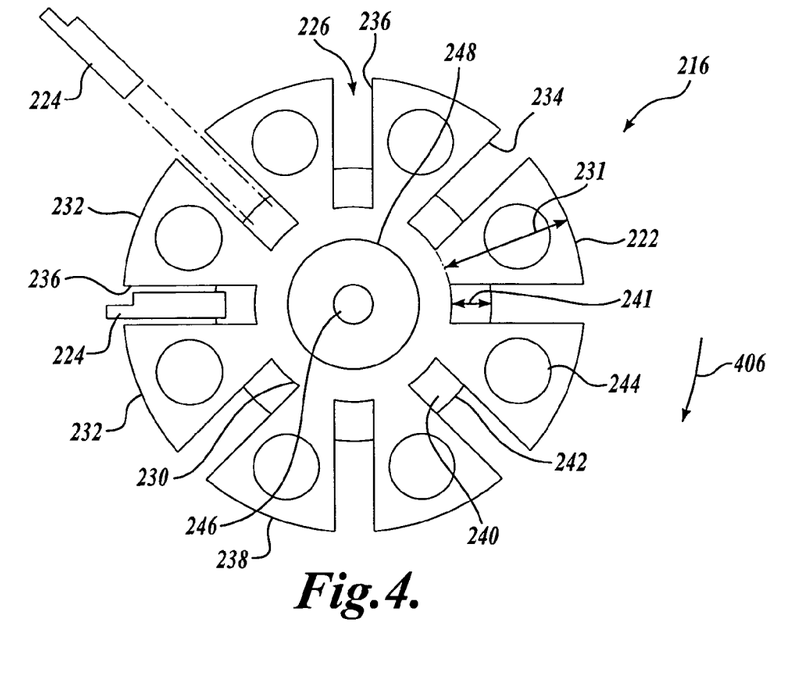
FIG. 4 is a bottom planar view of the rotor assembly of FIG. 3.

The inner chamber 214 (see FIG. 7) is sized to accommodate the rotor assembly 216. The rotor assembly 216 includes a rotor 222 and a plurality of vanes 224. Turning to FIGS. 3 and 4, the rotor assembly 216 will be described in further detail. As best shown in FIGS. 3 and 4, the vanes 224 are slidingly disposed within a plurality of radial and longitudinally oriented slots 226 formed in the rotor 222. The height of the vanes 224 substantially equals the height of the slots 226. When assembled, the rotor 222 is rotatingly mounted on an axle shaft 264 (see FIG. 7) fixedly connected to the main body portion 208 and disposed inwardly into the chamber 214 (see FIG. 7).

The rotor 222 includes an input shaft 228 attached to a base cylinder 230. Extending radially outward from the base cylinder 230 is a plurality of dividing members 232. Each dividing member includes a forward surface 234 which is substantially planar and faces in a direction of rotation 406 of the rotor 222. The forward surface 234 is oriented parallel with and offset slightly from a radially oriented plane containing a center axis of the rotor 222. Likewise, each dividing member includes an aft surface 236 which is also substantially planar and which faces away from the direction of rotation 406 of the rotor 222. The aft surface 236 is also oriented parallel with and offset slightly from a radially oriented plane containing the center axis of the rotor 222. Each dividing member 232 terminates in an arcuate end surface 238. In one embodiment, each dividing member 232 may also include a lightening bore 244 disposed in, but preferably not passing entirely through, the dividing member 232. In this embodiment, the lightening bores 244 are oriented parallel with the center axis of the rotor 222. The slots 226 for receiving the vanes 224 are defined by the forward and aft surfaces 234 and 236 of adjacent dividing members 232 and the outer cylindrical surface of the base cylinder 230.

Extending radially outward from the base cylinder 230 within each slot 226 is a strengthening member 240. Each strengthening member 240 extends between adjacent dividing members 232, tying the adjacent dividing members 232 together and to the base cylinder 230, thereby increasing the rigidity of the dividing members 232 and increasing their ability to resist deforming forces when the rotor assembly 216 is under load. Each strengthening member 240 has a height 243 which is less than a height 233 of the dividing members 232 by a predetermined amount. In one embodiment, the height 243 of the strengthening member 240 is less than about 90% of the height 233 of the dividing members 232, although other percentages may be practiced with the present invention, such as less than 80% or less than 70%. Each strengthening member 240 has a length 241 extending radially outward from the base cylinder 230 which is less than a width 231 of the dividing members 232 by a preselected amount. In one embodiment, the width 241 of the strengthening members 240 is less than about 60% the width 231 of the dividing members 232, although other percentages may be practiced with the present invention, such as less than 50% or less than 40%. Each strengthening member 240 has an arcuate outer surface 242.

Focusing on the input shaft 228 coupled to the base cylinder 230, the input shaft 228 includes an elongate lubricating channel 246 passing through the input shaft 228. The lubricating channel 246 passes axially through the entire rotor 222 and is in fluid communication with a bore 248 (best shown in FIG. 4) for receiving the axle shaft 264 (see FIG. 7), thereby providing a means of providing a fluid for lubricating the axle on which the rotor is rotatingly mounted. The input shaft 228 further includes a pair of drive flats 250 disposed on opposing sides of the input shaft 228 to aid the interfacing of the input shaft 228 with the transmission, such as the magnetic coupling unit, as will be described in further detail below. The input shaft 228 further includes a keyway 252 disposed longitudinally along a length of the input shaft 228. The keyway 252 provides an alternate means for coupling the input shaft 228 to the magnetic coupling unit.

The rotor 222, which includes the input shaft 228, is preferably made from a rigid or semirigid material, a few suitable examples being engineered plastics, chemical resistant plastics, metals, a few suitable examples being powder metals, injection metals, and castable metals, ceramics, etc. In one embodiment, the rotor 222 is made from polyphenylene sulfide (PPS) or polyetheretherketone (PEEK) with or without various fillers. In the illustrated embodiment, the rotor 222, including the input shaft 228, is molded as a single, homogenous, integrally formed, unitary part. The rotor 222 preferably has an outside diameter less than about 2 inches, 1.5 inches, or 1.2 inches, and preferably pumps less than about 3 ml or 2 ml per revolution. However, although specific values are disclosed for the illustrated embodiment regarding rotor diameter and pumping capacity, it should be apparent to those skilled in the art that in other embodiments formed in accordance with the present invention, the rotor may have outside diameters greater than 2 inches and which pump more than 3 ml per revolution.

Figures 5, 6:
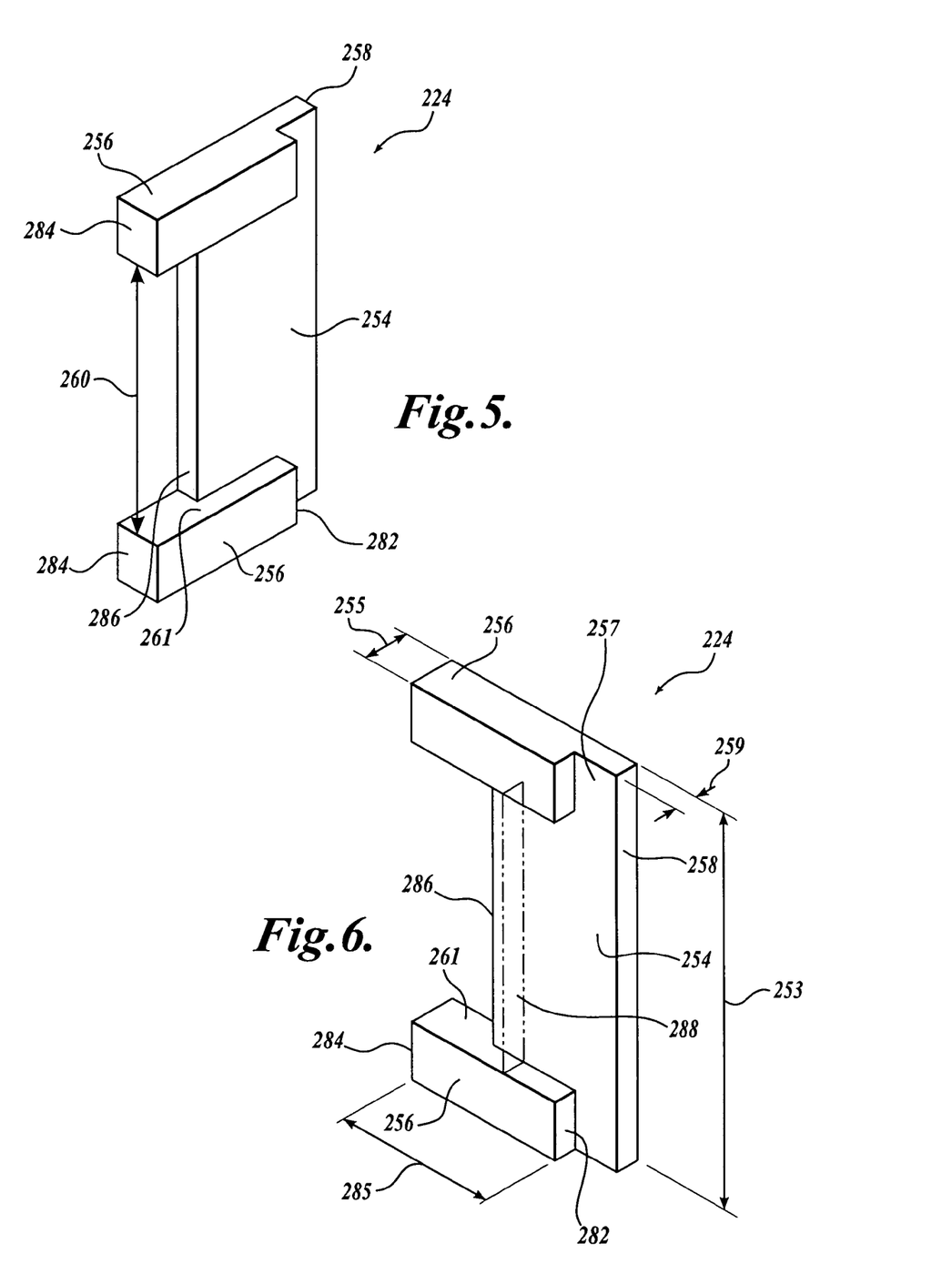
FIG. 5 is a perspective view of one of the vanes of FIG. 3 showing the inward facing surfaces of the vane.
FIG. 6 is a perspective view of the vane of FIG. 5 showing the outward facing surfaces of the vane.

Turning to FIGS. 5 and 6 and focusing on the vanes 224, each vane 224 includes a blade 254 and a pair of legs 256. The blade 254 is a substantially planar, rectangular shaped member having a distal or outer face 258 for sweeping along a sealing surface 262 of the inner chamber 214 (see FIG. 7). The edge 258 may be planar or arcuate to match the curve of the sealing surface of the inner chamber which it rides against. The height 253 of the blade 254 is substantially equal to the height of the rotor.

The legs 256 extend radially inward from the blade 254. The legs 256 are of a width or thickness 255 which exceed the thickness 259 of the blade 254, the thickness being substantially equal, but slightly less, than the thickness 259 of the slots 226 in the rotor 222 (see FIGS. 3 and 4). In a few suitable examples, the thickness of the blade 254 is less than about 90%, 80%, 70%, 60%, 50%, or 40% of the thickness of the legs 256. In one embodiment formed in accordance with the present invention, the thickness of the blade 254 is between about 70% to 40% of the thickness of the legs 256.

The difference of the thickness of the blade 254 relative to the thickness of the legs 256 creates a flow passageway 288 defined by the inner wall of the blade 254, a wall of the slot opposing the inner wall of the blade 254, and the opposing surfaces of the legs 256. This flow passageway 288 permits fluid to flow radially through this flow passageway 288 during operation such that the vane 224 can move relatively freely radially inward and outward in the slot without being hydraulically locked. For instance, when the vane 224 moves inward, fluid located inward of the vane 224 can flow outward through the flow passageway 288 to "make room" for the vane 224 to move inward. When the vane 224 moves radially outward, fluid flows inward through the flow passageway 228.

The opposing faces 261 of the legs 256 are separated by a distance 260 substantially equal to, but slightly more, than the height of the strengthening members 240 (see FIG. 3) so that the legs 256 may slidingly straddle the strengthening member. Thus, as shown in FIG. 4, the vanes 224 may be slidingly received within the slots 226 such that the vanes 224 are free to slide radially inward and outward within the slots 226 during operation.

The length 285 of the legs 256 is preferably chosen to terminate prior to the distal face 258 of the blade 254 such that an outward facing end surface 282 of the legs 256 does not engage the sealing surface of the pump housing during use. Such an arrangement helps the vane 224 to be hydraulically balanced, as will be described below. During use, high pressure fluid acts upon inward facing end surfaces 284 of the legs 256 and a proximal or inward positioned face 286 of the blade 254 thereby biasing the vane 224 radially outward (along with centrifugal forces). High pressure fluid acting upon the outward facing end surfaces 282 of the legs 256 helps to balance, i.e., counter act, these outward acting forces to reduce the pressure on the outer face 258 of the blade 254 against the sealing surface of the pump housing. It will be appreciated that inasmuch as the outer face 258 of the blade 254 acts as a seal, approximately half of the surface area of the outer face 258 is acted upon by high pressure fluid and the other half acted upon by lower pressure fluid. The divide between the low and high pressure fluid is approximately along a vertically oriented centerline of the outer face 258. Thus, half of the surface area of the outer face 258 is acted upon by a high pressure fluid that helps to counteract the outward acting forces tending to drive the vane 224 outward toward the sealing surface. The other half of the surface area is acted upon by a lower pressure fluid. Thus, the high pressure fluid acting upon the end surfaces 284 of the legs and inward proximal face 286 is able to overcome the counteracting forces acting upon the outward facing end surfaces 282 of the legs 256 and the outer face 258 of the blade 254, thus permitting hydraulic pressures to bias the vane 224 outward to the sealing surface with sufficient force to provide adequate sealing, but not too much to result in excessive friction and wear. When this condition is present, the vanes 224 are hydraulically balanced.

Further, inasmuch as the blade 254 does not extend all the way inward to the same extent of the legs 256, the surface area of the blade 254 which rides against the walls of the dividing members during use is reduced, thereby reducing fluid shear stresses along this wall and reducing friction losses, which increases the efficiency of the pump. For instance, in some suitable examples, the blade 254 has a radially oriented length that is less than approximately 70%, 60%, 50%, or 40% of the radially oriented length of the slots 226 (see FIG. 4). However, inasmuch as the legs 256 extend inward past the inward facing edge 286, the stability of the vane 224 during use is maintained since the vane 224 still has sufficient length as maintained by the legs 256 to maintain stability in a cantilevered position in the slots, i.e., the position of the vanes 224 when loaded during use.

Figure 7:
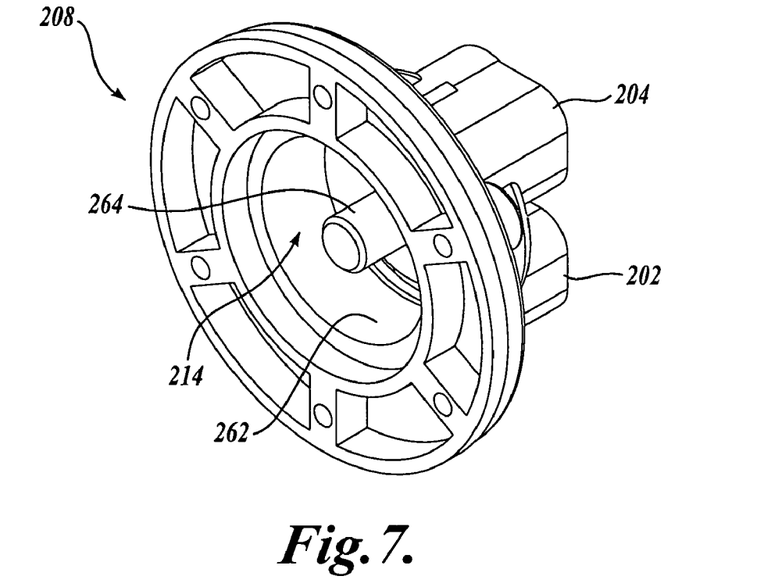
FIG. 7 is a perspective view of a main body portion of a housing of the rotary vane pump shown in FIG. 2.
Figure 8:
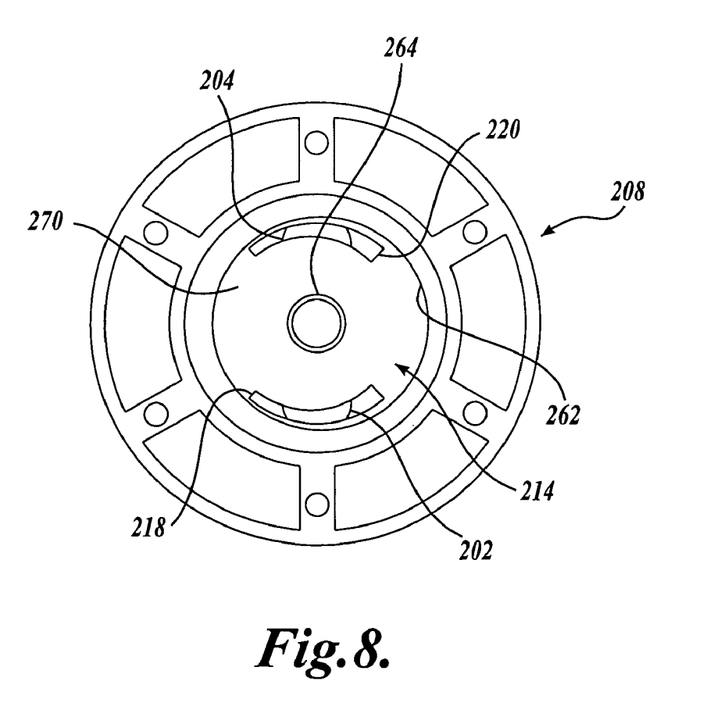
FIG. 8 is a planar view of the main body portion of FIG. 7.

Turning to FIGS. 7 and 8, the main body portion 208 will be described in more detail. The main body portion 208 includes the input and outlet passageways 202 and 204 passing longitudinally through the main body portion 208 so as to be in fluid communication with the inner chamber 214. The inlet passageway 202 terminates in an inlet recess 218 in the inner chamber 214. The inlet recess 218 is an elongate channel which is arcuate in shape. The shape, position, and length of the inlet recess 218 is selected to control the timing and duration in which pumping chambers disposed between adjacent vanes of the rotor assembly 216 (see FIG. 2) disposed within the inner chamber 214 is in fluid communication with the inlet passageway 202 as is well known in the art. Likewise, the outlet passageway 204 terminates in an outlet recess 220 in the inner chamber 214. The outlet recess 220 is also an elongate channel which is arcuate in shape. The shape, position, and length of the outlet recess 220 is selected to control the timing and duration in which pumping chambers disposed between adjacent vanes of the rotor assembly 216 (see FIG. 2) are disposed within the inner chamber 214 is in fluid communication with the outlet passageway 204 as is well known in the art.

Figure 9:
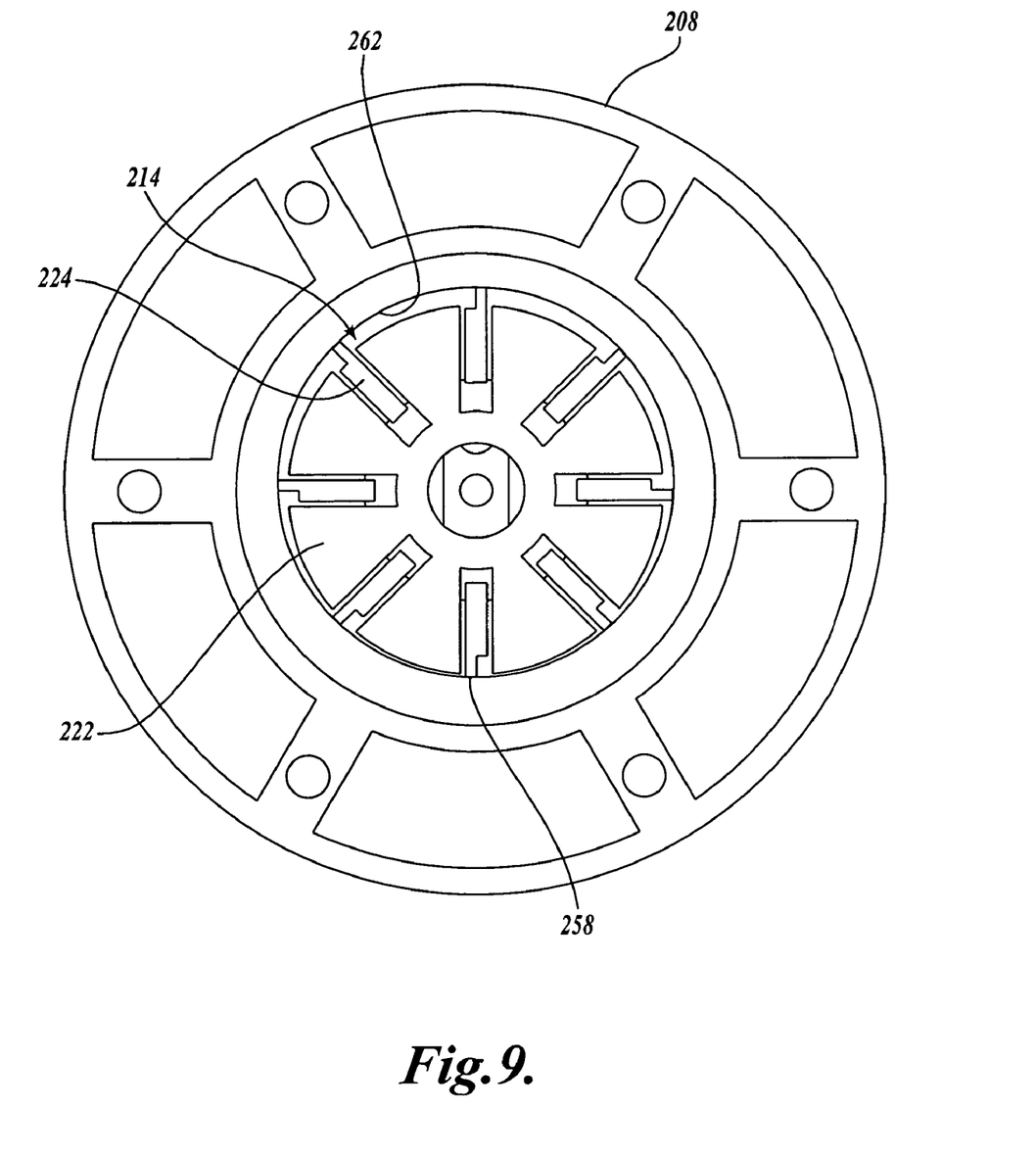
FIG. 9 is a planar view of the main body portion of FIG. 7 with the rotor assembly shown disposed in the main body portion.

Referring to FIG. 9, the main body portion 208 defines a majority of the inner chamber 214. More specifically, the main body portion 208 defines the cam or sealing surface 262. The inner sealing surface 262 is adapted to engage the outer edges 258 of the vanes 224 as the rotor 222 rotates within the inner chamber 214. The sealing surface 262 is preferably round, however other shapes of the sealing surface 262 are suitable for use with and are within the spirit and scope of the present invention, a few suitable examples being oval and other non-circular shapes. Of note, the center point of the sealing surface 262 is slightly offset from the center of rotation of the rotor 222, and further, a diameter of the sealing surface 262 is slightly larger than the diameter of the rotor 222. Thus, the gap between the outer surface of the rotor 222 and the inner sealing surface 262 of the main body portion 208 varies about the outer perimeter of the rotor 222. This variance in the gap is used to pump fluids, as is well known in the art.

Turning back to FIGS. 7 and 8, the main body portion 208 includes fixed shaft 264 extending longitudinally through a center of the inner chamber 214, as was briefly described above. The shaft 264 is sized to be rotatingly received within the bore 248 of the rotor 222 (see FIG. 4). The shaft 264 thereby acts as an axle about which the rotor rotates. The shaft 264 may be made of any rigid or semi-rigid material, a few examples being a wear resistant and low friction material, such as ceramic materials, metal materials, one suitable example being a steel, such as a corrosion resistance steel alloys with a smooth or polished surface, or 316 stainless steel. The shaft 264 is preferably press fit into a bore of the main body portion 208, however it should be apparent to those skilled in the art that the shaft 264 may be attached in any suitable manner.

Figure 10:
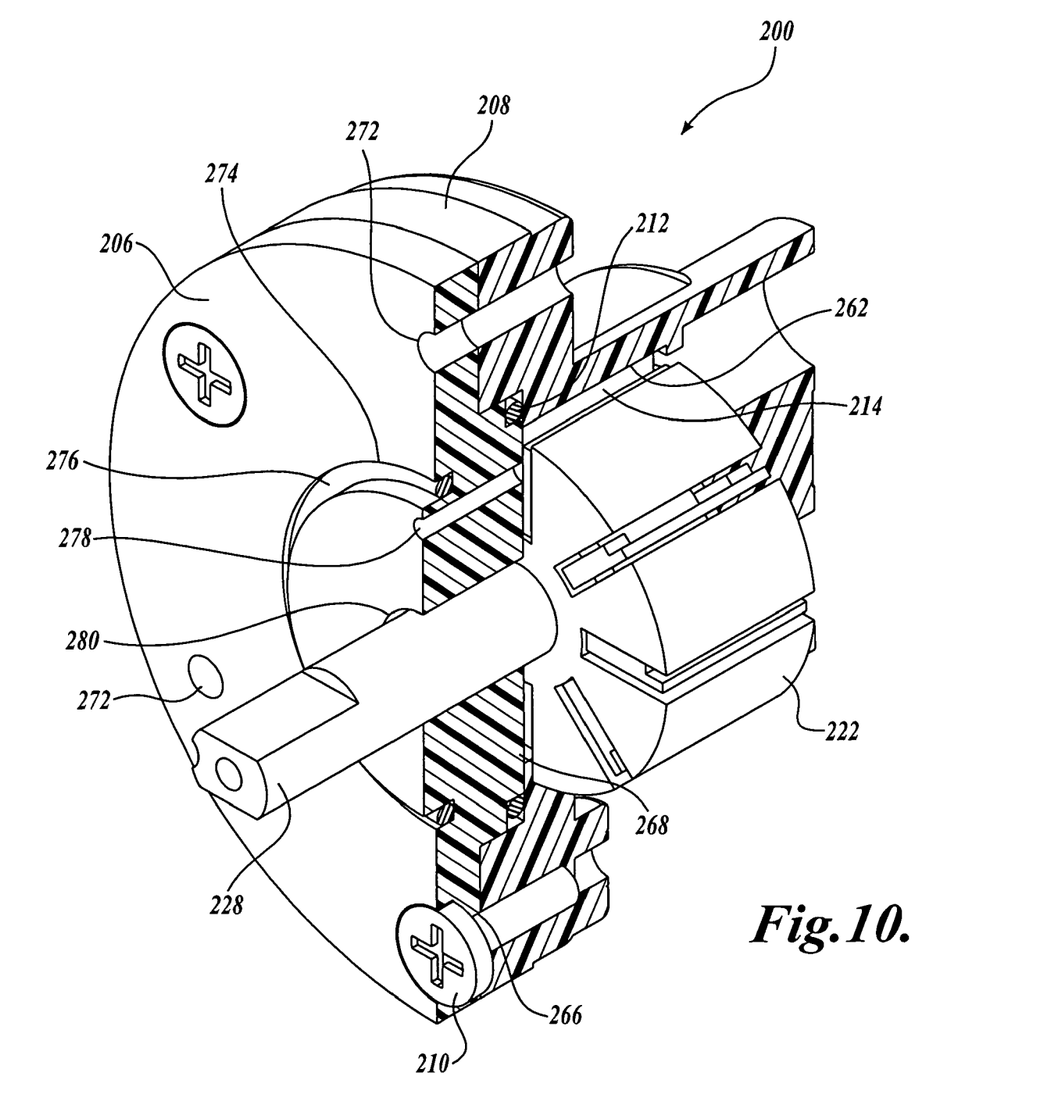
FIG. 10 is a partial cross-sectional perspective view of the rotary vane pump of FIG. 1, the cross-sectional cut passing through and parallel with a centerline of the rotary vane pump.

Referring to FIG. 10, this detailed description will now focus upon the end plate 206. The end plate 206 is adapted to sealingly engage the main body portion 208 via sealing member 212. The end plate 206 includes a plurality of apertures 266 passing longitudinally through the end plate 206 to permit a plurality of fasteners 210 to clamp the end plate 206 to the main body portion 208. The inward facing surface of the end plate 206 facing the rotor 222 forms a thrust plate 268 (best shown in FIG. 2) and defines, along with the sealing surface 262 and an opposing thrust plate 270 (see FIG. 8) of the main body portion 208, the inner chamber 214.

Figure 11:
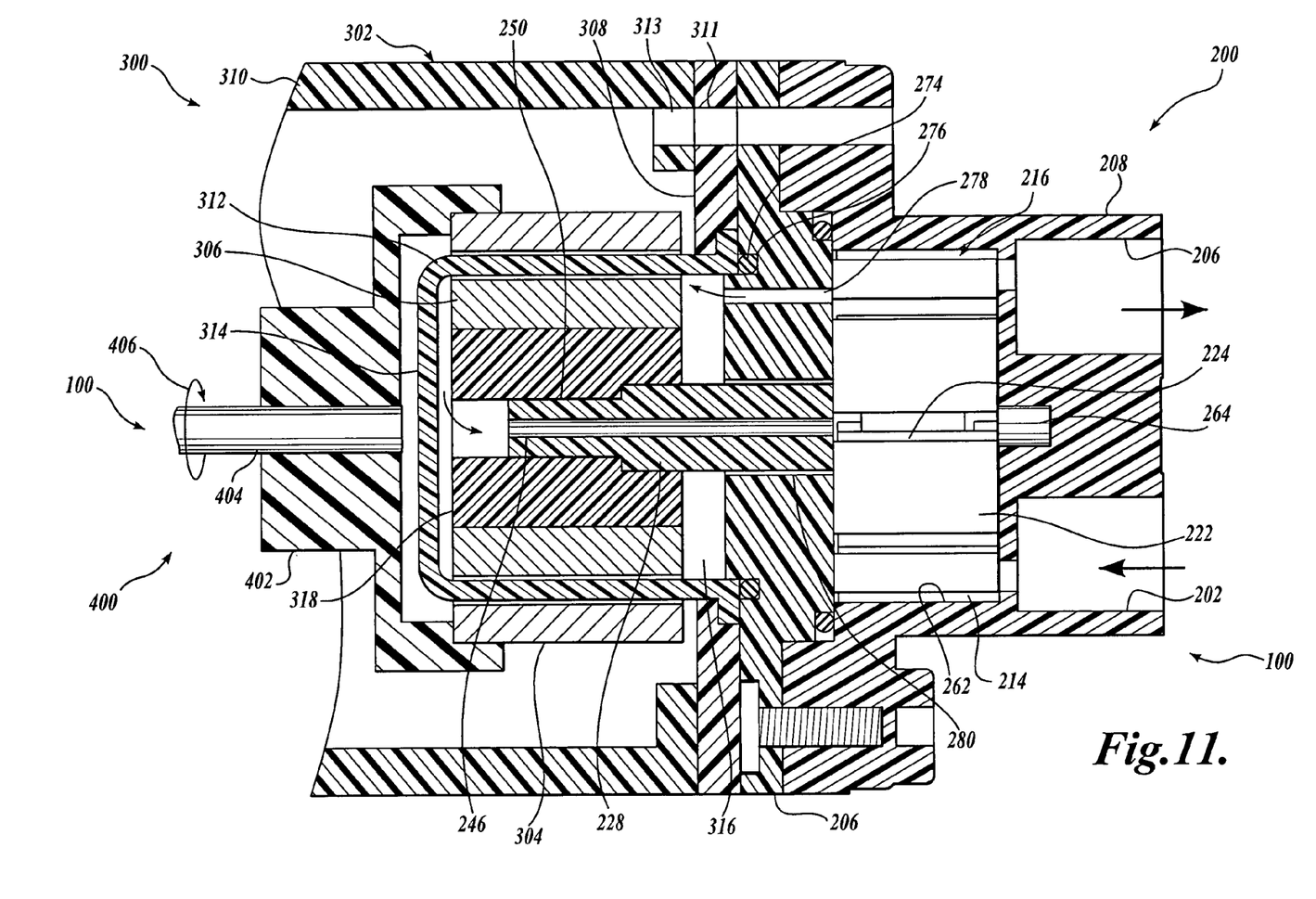
FIG. 11 is a partial cross-section elevation view of the rotary vane pump and transmission unit of FIG. 1, the cross-section cut passing through and parallel with a centerline of the rotary vane pump and transmission unit with a rotor not shown in cross-section for purposes of clarity.

The end plate 206 also includes a second set of apertures 272 for permitting the coupling of the rotary vane pump 200 to the transmission, such as the magnetic coupling unit, and prime mover. The end plate 206 further includes an annular shaped channel 274 disposed upon the outer surface of the end plate 206. The channel 274 is adapted to receive a sealing member 276, such as an O-ring, therein. Turning to FIG. 11, the channel 274 and sealing member 276 aid the coupling of the transmission, such as the magnetic coupling unit 300, and prime mover 400 to the rotary vane pump 200 in a sealed manner. The end plate 206 further includes a lubricating passageway 278 passing through the end plate 206. The lubricating passageway 278 places the inner chamber 214 in fluid communication with the transmission, such as the magnetic coupling unit 300, the significance of which will be described in more detail below.

Referring to FIG. 10, the end plate 206 further includes a shaft aperture 280 passing longitudinally through the center of the end plate 206. The shaft aperture 280 is sized and configured to permit the input shaft 228 to rotate therewithin. In the illustrated embodiment, the shaft aperture 280 preferably does not sealingly engage the input shaft 228. Thus, fluid being pumped within the inner chamber 214 may pass along the input shaft 228 and out the shaft aperture 280, or conversely, pass back into the inner chamber 214 through the shaft aperture 280.

Turning to FIG. 11, one transmission, such as the magnetic coupling unit 300, that may be practiced with the present invention will be described in further detail. The magnetic coupling unit 300 includes a casing 302, an outer magnet set 304, and an inner magnet set 306. The casing 302 includes a base 308, an outer casing 310, and an inner casing 312. The base 308 is annular in shape and is coupled to the end plate 206 of the rotary vane pump 200 via fasteners passing through a series of mounting apertures 311 passing longitudinally through the base 308.

The outer casing 310 is generally cylindrical in shape and is coupled to the base 308 via fasteners passing through a series of mounting apertures 313 extending inward of the outer casing 310. The outer casing 310 houses the inner components of the magnetic coupling unit 300 impeding their damage from impact and contamination from dirt, moisture, etc. The outer casing 310 also impedes user injury by blocking their access to the components housed within the outer casing 310 and aids in the mounting and alignment of the prime mover 400 to the rotary vane pump 200.

The inner casing 312 is generally cylindrical in shape and is clamped to the end plate 206 by the base 308. The inner casing 312 sealingly engages the end plate 206 via the sealing member 276. The inner casing 312 includes an end cap 314 for closing off the cylindrical walls of the inner casing 312 to form a pressure vessel 316 defined by the inner surface of the inner casing 312 and the end plate 206 inward of the sealing member 276.

Disposed within the inner casing 312 is the input shaft 228. Coupled to the input shaft 228 via the drive flats 250 is a hub 318 that is generally cylindrical in shape. Coupled to the outer surface of the hub 318 is the set of inner magnets 306. The inner casing 312 is stationary, and the input shaft 228, hub 318, and the set of inner magnets 306 are all coupled to one another through interference fit or other means, and rotate as a unit within the inner casing 312.

The outer magnets 306 are rotatingly suspended outside of the inner casing 312 by a drive flange 402 coupled to a drive shaft 404 of the prime mover 400. Rotation of the drive flange 402 via rotation of the drive shaft 404 of the prime mover 400 results in the rotation of the set of outer magnets 304 around the inner casing 312. The set of outer magnets 304 are selected to interact with the set of inner magnets 306 such that rotation of the outer magnets 304 results in a corresponding rotation of the set of inner magnets 306, and thus a corresponding rotation of the rotor 222.

The prime mover 400 may be any well know or to be developed unit able to apply a torque, a few suitable examples being Alternating Current (AC) motors, Direct Current (DC) motors, Brushless Direct Current (BLDC) motors, pneumatic motors, and variable speed motors. The magnetic coupling unit 300 may be any well known or to be developed unit able to transfer a torque using magnets, a few suitable units being available from TUTHILL CORPORATION, Concord, Calif., such as those used with their D-Series, P-Series, U-Series, or T-Series magnetic coupled external gear pumps.

Referring to FIG. 11, in light of the above description of the components of the pump assembly 100, the operation of the pump assembly 100 will now be described. The prime mover 400 (best seen in FIG. 1) is actuated to rotate drive shaft 404 in the direction indicated by arrow 406. This in turn causes rotation of the drive flange 402 and outer magnets 304. Rotation of the outer magnets 304 causes rotation of the inner magnets 306 disposed inside of the inner casing 312. Rotation of the inner magnets 306 in turn causes rotation of the hub 318 and the rotor assembly 216. As the rotor 222 of the rotor assembly 216 rotates, the vanes 224 are forced radially outward by centrifugal and hydraulic forces as described above, into sealing relationship with the sealing surface 262 of the main body portion 208. Pump chambers are formed between adjacent vanes 224 which create a vacuum as they pass the inlet passageway 202, drawing in the fluid to be pumped. As the rotor rotates further, the pump chambers carry the fluid from the inlet passageway 202 to the outlet passageway 204 for discharge as is well known in the art. During the pumping process, a small portion of the fluid being pumped passes through lubricating channel 278 out of the rotary vane pump 200 and into the pressure vessel 316 defined by the inner casing 312 and the end plate 206. The fluid passes through the pressure vessel 316 cooling the magnetic coupling unit 300 and then passes down the lubricating channel 246 of the input shaft 228. The fluid passing down the lubricating channel 246 of the input shaft 228 lubricates the fixed shaft 264 rotating within the rotor 222 and then rejoins the fluid being pumped.

Although the above described embodiment is illustrated and described as using a transmission of a magnetic variety for transferring power from a prime mover to the rotary vane pump, it should be apparent to those skilled in the art that other transmissions may be used for transferring power to the rotary vane pump, and further that the transmission may be eliminated all together by coupling an output shaft of the prime mover directly to the rotary vane pump.

Figure 12:
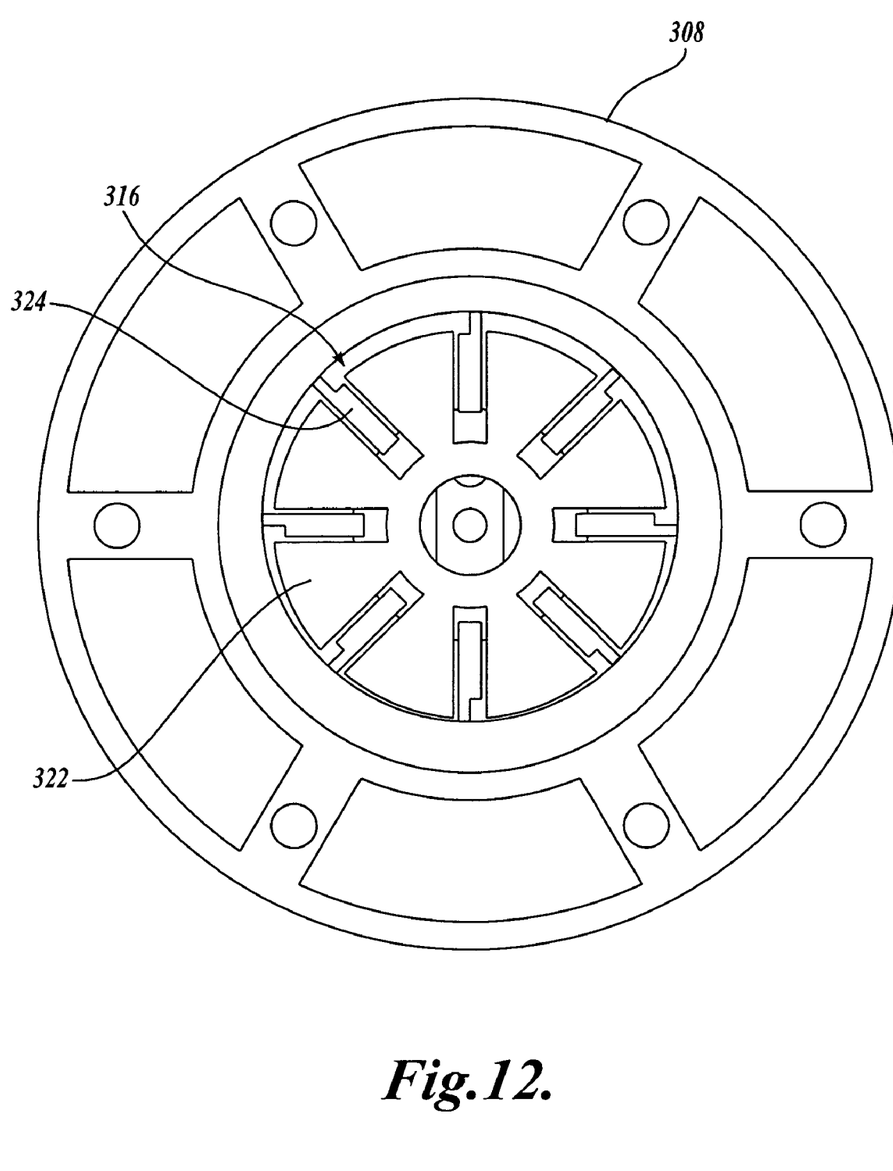
FIG. 12 is a alternate embodiment of the rotor assembly and main body portion of FIG. 9 shown with the vanes disposed in an orientation suitable for reversible pump flow.

Referring to FIG. 12, an alternate embodiment of the rotor assembly 216 and main body portion 208 of FIG. 9 is shown. The rotating pump assembly 316 of FIG. 12 is identical in construction and operation to the rotor assembly 216 and main body portion 208 of FIG. 9 with the exception of the orientation of the vanes 324. Every other vane 324 has been rotated 180 degrees. Orientating the vanes 324 is this manner permits the rotating pump assembly 316 to pump fluid in either direction. More specifically, the rotor 322 can be rotated clockwise to permit a user to pump fluid from a first port acting as an inlet to a second port acting as an outlet, or alternately rotated counterclockwise to pump fluid from the second port, now acting as an inlet, to the first port, now acting as an outlet without the rotary vane pump having to be taken apart and the orientation of the vanes 224 rotated a 180 degrees as would be the case for the embodiment of FIGS. 1-11.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A rotary vane pump for pumping a fluid, the rotary vane pump comprising:
    (a) a pump housing defining an interior chamber having a sealing surface;
    (b) a rotor rotatingly disposed within the interior chamber, the rotor having a plurality of slots;
    (c) a plurality of vanes, each vane moveably disposed in one of the plurality of slots;
    (d) an input shaft coupled to the rotor for applying a torque to the rotor, wherein the input shaft and rotor are a unitary, integrally formed component;
    (e) wherein the plurality of vanes are actuatable into a substantially sealing relationship with the sealing surface of the pump housing by centrifugal forces and hydraulic forces and not mechanical forces during pumping of the fluid; and
    (f) a fixed shaft disposed in the housing and wherein the rotor includes a bore for rotatingly receiving the fixed shaft, wherein the input shaft includes a fluid passageway passing axially through the input shaft.

2. The rotary vane pump of claim 1, wherein the input shaft and rotor are an integrally molded component.

3. The rotary vane pump of claim 1, wherein the rotor has a diameter less than about 1.5 inches.

4. The rotary vane pump of claim 1, wherein the rotary vane pump is configured to pump a preselected amount of a fluid per each revolution of the rotor, wherein the preselected amount is less than about 3 ml per revolution.

5. A rotary vane pump for pumping a fluid, the rotary vane pump comprising:
    (a) a pump housing;
    (b) a fixed shaft disposed in the housing;
    (c) a rotor having a bore for rotatingly receiving the fixed shaft, the rotor having a plurality of slots;
    (d) a plurality of vanes, each vane moveably disposed in one of the plurality of slots; and
    (e) an input shaft coupled to the rotor for applying a torque to the rotor for rotating the rotor upon the fixed shaft, wherein the input shaft includes an axial bore passing through the input shaft for supplying a fluid through the axial bore to lubricate the fixed shaft.

6. A pump assembly comprising:
    (a) a pump housing;
    (b) a rotor rotatingly disposed within the housing, the rotor having a plurality of slots;
    (c) a plurality of vanes, each vane moveably disposed in one of the plurality of slots; and
    (d) an input shaft coupled to the rotor for applying a torque to the rotor;
    (e) a prime mover for generating a torque; and
    (f) a magnetic coupling unit for magnetically transferring the torque generated by the prime mover to the input shaft; wherein the input shaft includes a passageway passing axially through the input shaft for transferring a fluid between the pump housing and the magnetic coupling unit.

7. The pump assembly of claim 6, further comprising an input shaft coupled to the rotor and passing through the pump housing in a non-fluid sealing manner through an aperture, wherein the magnetic coupling unit includes a pressure vessel sealingly coupled to the pump housing for containing any fluid passing out of the housing through the aperture.

8. The pump assembly of claim 7, wherein the magnetic coupling unit includes a first magnet coupled to the input shaft and disposed inside of the pressure vessel and a second magnet rotatingly disposed outside of the pressure vessel for interacting with the first magnet to induce rotation of the first magnet.

9. The pump assembly of claim 6, wherein a single rotation of the rotor results in less than 3 ml of fluid being pumped.

* * * * *